(12) United States Patent
Naik et al.

(10) Patent No.: US 8,231,349 B2
(45) Date of Patent: Jul. 31, 2012

(54) GAS TURBINE AIRFOIL

(75) Inventors: Shailendra Naik, Gebenstorf (CH);
Brian Kenneth Wardle, Brugg-Lauffohr (CH)

(73) Assignee: ALSTOM Technology Ltd., Baden (CH)

(*) Notice: Subject to any disclaimer, the term of this patent is extended or adjusted under 35 U.S.C. 154(b) by 604 days.

(21) Appl. No.: 12/400,035

(22) Filed: Mar. 20, 2009

(65) Prior Publication Data
US 2010/0254824 A1 Oct. 7, 2010

(30) Foreign Application Priority Data
Mar. 31, 2008 (EP) ...................................... 08153693

(51) Int. Cl.
  *F01D 5/08* (2006.01)
  *F01D 5/20* (2006.01)
(52) U.S. Cl. ..................................................... 416/97 R
(58) Field of Classification Search .................. 416/97 R
  See application file for complete search history.

(56) References Cited

U.S. PATENT DOCUMENTS

| | | | |
|---|---|---|---|
| 2,879,028 A | 3/1959 | Stalker | |
| 5,246,340 A | 9/1993 | Winstanley et al. | |
| 5,660,524 A | 8/1997 | Lee et al. | |
| 5,813,836 A | 9/1998 | Starkweather | |
| 2003/0133797 A1 | 7/2003 | Dailey | |
| 2005/0281673 A1* | 12/2005 | Draper et al. | 416/97 R |
| 2006/0056967 A1* | 3/2006 | Liang | 416/97 R |
| 2007/0041835 A1 | 2/2007 | Charbonneau et al. | |
| 2007/0128034 A1* | 6/2007 | Lee et al. | 416/97 R |
| 2007/0172355 A1 | 7/2007 | Cunha et al. | |

FOREIGN PATENT DOCUMENTS

| | | |
|---|---|---|
| EP | 1533474 | 5/2005 |
| EP | 1793084 | 6/2007 |
| WO | WO98/00627 | 1/1998 |

OTHER PUBLICATIONS

Search Report for European Patent App. No. 08153693.0 (Sep. 29, 2008).

* cited by examiner

*Primary Examiner* — Ha Tran T Nguyen
*Assistant Examiner* — Valerie N Brown
(74) *Attorney, Agent, or Firm* — Cermak Nakajima LLP; Adam J. Cermak (57) ABSTRACT

A turbine component (25) includes a root (21), a tip (22), and an airfoil portion (7) having a leading and a trailing edge (8,9), an external suction side and pressure side wall (13, 14) between the leading and trailing edge. The walls enclose a central cavity (1-6) for the passage of cooling air, the cavity being partitioned into a leading edge- and a trailing edge region (7a, 7b) by at least one longitudinally extending first web (15) connecting the suction side wall with the pressure side wall and a second longitudinally extending web (16), connecting the first web with the suction side wall, thereby defining a first and second entry chamber (2, 3). The first web (15) is provided with at least one cross-over hole (H1) between the first entry chamber and the leading edge chamber (1), whereas the second web has no openings.

36 Claims, 8 Drawing Sheets

GAS TURBINE AIRFOIL

This application claims priority under 35 U.S.C. §119 to European application no. 08153693.0, filed 31 Mar. 2008, the entirety of which is incorporated by reference herein.

BACKGROUND

1. Field of Endeavor

The present invention relates to airfoil blades or vanes for gas turbine engines and more particularly to an improved cooling of such blades or vanes.

2. Brief Description of the Related Art

In the field of gas turbine engines, hot combustion gases flow from a combustion chamber through one or more turbines. The hot gases provide power for one or more compressors and output power which can be used for other purposes. The turbine blades and vanes therefore have to withstand the high temperatures of the hot gases without losing operating efficiency. This can be achieved by cooling.

Various methods of internal cooling of turbine blades to keep blade temperatures within certain limits are known in the state of the art. Known methods of cooling blades and vanes are performed by supplying passages within the blades or vanes with pressurized cooling air derived from the compressor. Cooling techniques include a so-called "serpentine cooling" circuit of series-connected, longitudinally oriented passages producing serpentine flow which increase cooling effectiveness by extension of the length of the coolant flow path. Serpentine cooling is efficient by reusing the cooling air in successive longitudinal passages of the circuit. By providing openings in the webs separating the passages, cooling air streaming through the inner passages can provide convective and/or "impingement cooling" of the blade or vane before being exhausted. Impingement cooling has a high heat transfer, but can be wasteful, as the cooling air is not reused. A further known cooling method, useful for the cooling of the external wall surfaces of the airfoil, so-called "film-cooling", is achieved by providing holes in the airfoil surface of the blade or vane. The combination of impingement cooling and film cooling is sometimes difficult as the high pressure of the cooling air necessary for impingement cooling can lead to separation of the film cooling flow from the external airfoil surface, thus reducing the cooling efficiency.

Various designs of airfoil portions are known in the state of the art. For example, the so-called "double wall concept" is known, in which at least one longitudinal wall extending parallel to and between the suction side wall and the pressure side wall of an airfoil portion. On the other hand, the mere connection of the suction side wall and the pressure side wall by longitudinal webs is known as the so-called "girder concept". Most advanced blading technologies striving to allow higher firing temperatures allow both impingement cooling and film cooling.

U.S. Pat. No. 5,246,340 discloses an airfoil portion manufactured in two casting halves having radial internal ribs or webs with cooling air cross-over holes, said webs dividing the interior of the blade or vane in to a plurality of cavities. U.S. Patent Application Publication Nos. 2003/0133797 and 2007/0172355 disclose airfoil portions with webs connecting the suction side wall and the pressure side wall, wherein the webs are arranged angled to each other. A combination of the above mentioned double wall concept and the girder concept is seen, e.g., in U.S. Pat. No. 5,660,524. Here, the inner walls include walls which extend between and are monolithic with a portion of the outer walls. Also, a central insert is provided, forming two impingement chambers between the central insert and the external walls.

SUMMARY

One of numerous aspects of the present invention includes an airfoil portion of a blade or vane having improved internal cooling with respect to the state of the art, e.g., in order to allow for even higher firing temperatures or lower cooling flows.

The aforementioned related art does not provide any suggestions to solve this problem.

Another aspect of the present invention involves a gas turbine engine component comprising, along a longitudinal axis of the component, a root and a tip, and further comprising an airfoil portion having a leading edge, a trailing edge, an external suction side wall and an external pressure side wall extending between said leading edge and said trailing edge. Said external walls enclose a central cavity for the passage of cooling air from the root to the tip and/or from the tip to the root. The cavity is partitioned into a leading edge region and a trailing edge region by at least one longitudinally extending first web connecting said suction side wall with said pressure side wall, thereby defining in the leading edge region a leading edge chamber. The leading edge chamber is therefore bordered by the suction side wall, the pressure side wall and said first web. Furthermore, a second longitudinally extending web is provided, connecting said first web with the suction side wall (or alternatively with the pressure side wall), thereby defining a first entry chamber on the suction side of the second web and a second entry chamber for cooling air in the trailing edge region.

Generally, the external walls and the internal webs extend from the root to the tip; however, connecting passages or openings across walls or across webs between adjacent passages are possible. The first web has at least one cross-over hole for the passage of cooling air between the first entry chamber and the leading edge chamber, whereas the second web is devoid of openings or passages. Preferably, at least one cross-over hole in said first web between the first entry chamber and the leading edge chamber is the only outlet for cooling air from the first entry chamber, which means that preferably neither the portion of the suction side wall bordering the first entry chamber, nor the second web, contain any cooling air cross-over holes.

A key feature of the invention is therefore the fact that a central web geometry in the airfoil portion is introduced, providing the desired rigidity to the structure and further that the cross-over holes between the chambers are arranged such that the cooling air flow toward the leading edge, i.e., into the leading edge chamber can be better controlled and tailored. This is at least partially achieved by splitting the inlet flow of cooling air from the combustor into two parts and thereby providing two separate inlet flows into the leading edge chamber, i.e., a cooling air channel both on the suction side and on the pressure side of the leading edge chamber. A system cooled embodying principles to the present invention enables the airfoil, and thereby the turbine, to, e.g., operate at a higher inlet hot gas temperature, while maintaining the same (or lower) cooling air consumption relative to the hot gas temperatures used in the state of the art.

It is still desirable to better control the cooling air streaming through and between the cooling chambers, especially the cooling air flowing into the leading edge chamber. When cooling air flows from the root up to the tip, it is subject to a pressure loss. The present invention to this end allows the adjustment of the pressure of the cooling air flow by adjusting the size of the cooling air cross-over holes according to the required pressure without losing the rigidity and stability of the airfoil structure or even increasing it.

In a first preferred embodiment of the present invention, the first web is partitioned into two longitudinal wall portions by said second web. Preferably, the second web connects to the first web in a region of the first web located along the first web between 30% and 70%, more preferably between 40% and 60%, most preferably at approximately half of the distance between the suction side wall and the pressure side wall along the first web. One can say that in a cross-sectional view of the airfoil portion perpendicular to the plane of the webs along the longitudinal axis of the turbine component, the second web and the first web together form a "T", of which the second web comprises the leg, being based at the suction side wall, and the first web forming the girder of the "T". By the connection with the second web in a central region of the first web, the first web is partitioned into two arms or arm portions which can be defined as a suction side arm portion and a pressure side arm portion, depending on the wall to which each is attached. Preferably, the two arm portions are essentially of the same length or are sized in a ratio of lengths in the range of about 0.25 to about 4.0, preferably about 0.5-2.0. Preferably, the second web does not contact the pressure side wall, but on one side only a portion of the suction side wall and on the other side the first web.

Preferably, the second web has an equal or greater thickness than the first web. Preferably, the ratio of the thickness of the second web to the thickness of the first web is in the range of 1.01 to 1.20. The webs preferably have a thickness in the range of approximately 2 to 10 mm, the thickness being measured in a direction perpendicular to the plane of the web.

Preferably, the first web is arranged at an angle of approximately 60-120 degrees, preferably approximately 75-100 degrees, with respect to a central plane longitudinally dividing the airfoil portion into a suction side half and a pressure side half. This central plane longitudinally dividing the airfoil portion is defined as follows: the perpendicular distance from said plane to an external surface of the suction side wall is the same as the perpendicular distance from said plane to an external surface of the pressure side wall at every point along the plane in the cross-sectional view. Preferably, the second web extends from the first web at an angle of approximately 60-120 degrees, preferably approximately 75-100 degrees.

According to a further preferred embodiment, the at least one cross-over hole in the first web between the first entry chamber and the leading edge chamber is a longitudinally extending row of holes, which preferably are impingement holes, allowing the cooling air to impinge on the wall onto which it is directed. The cross-sectional area of the holes within the row is preferably larger in a tip-region than in a root-region, and the cross-sectional area of the holes is preferably stepwise or successively increased from the root to the tip. The cross-sectional shape of the holes preferably is circular, however, the holes can also be of an anisotropic shape. The increased size of holes in the tip region can be advantageous to compensate for a pressure loss which can occur, the closer toward the tip the air flows.

It is of further advantage if the first web is additionally provided with at least one cross-over hole between the second entry chamber and the leading edge chamber. Said at least one cross-over hole preferably is a longitudinally extending row of cross-over holes, more preferably of cross-over impingement holes. These holes directing the air from the second entry chamber into the leading edge chamber preferably have an essentially constant cross-sectional area from the root to the tip and preferably all are of a circular shape. However, other (anisotropic) shapes of holes or varying sizes within the row are also possible.

Preferably, the first web contains two longitudinally extending rows of impingement holes, of which the holes between the first entry chamber and the leading edge chamber preferably have a cylindrical, circular cross-sectional shape of a successively or stepwise increasing cross-sectional area from the root to the tip, while the holes between the second entry chamber and the leading edge chamber preferably have a cylindrical, circular cross-sectional shape with a constant cross-sectional area from the root to the tip.

According to a further preferred embodiment of the present invention, the suction side wall and/or the pressure side wall is provided with at least one exit hole for the exhaustion of cooling air into the hot gas path, said at least one exit hole preferably being a film cooling hole, more preferably a row of exit holes, preferably of film cooling holes. Said film cooling hole preferably is not arranged perpendicular to the plane of the wall, but preferably at an acute angle to the wall.

It is of further advantage, if at least a third web connecting the suction side wall with the pressure side wall is provided on the trailing edge side of the second entry chamber, thereby separating the second entry chamber from a first intermediate chamber. Preferably, a third web is provided, separating the second entry chamber from a first intermediate chamber, and a fourth web is provided, separating the first intermediate chamber from a second intermediate chamber. Even more preferably, a fifth web is provided, separating the second intermediate chamber from a trailing edge chamber. Further additional webs are possible, dividing the cavity into still more chambers.

At least one of the additional webs is advantageously provided with at least one cross-over hole, preferably at least two cross-over holes, wherein the hole preferably is a longitudinally extending row of holes, preferably of impingement holes. Within said rows, the holes are preferably arranged over each other in a longitudinal direction of the turbine component or the web, respectively. Preferably, the third and the fourth web each have at least one row of holes, preferably two rows of holes, whereas preferably the fifth web or any other web defining the trailing edge chamber, is devoid of any impingement holes.

According to a further preferred embodiment of the present invention, in at least one additional web, preferably in the third and fourth web, the cross-sectional area of the cross-over holes and/or of the holes within the at least one, preferably two rows, is larger in the tip-region than in the root-region. Also, preferably the cross-sectional area of the holes is stepwise or successively increased from the root to the tip. Preferably, if at least one row of holes with successively increased cross-sectional areas toward the tip is provided in the first web, the cross-sectional area of the holes in a row in the at least one additional web increases less compared to the holes in the first web. However, these holes can also be of a constant cross-sectional area over the length of the row, and it is also possible, that if more than one row of holes is provided in one web, at least one row has holes with a constant cross-sectional area within the row from root to tip, and at least one other row has holes with a cross-sectional area increasing (or decreasing) from root to tip. Preferably, the holes are disposed in the web such that a long axis of the cross-sectional area of the holes is essentially parallel to the longitudinal axis of the turbine component or web, and a short axis of the cross-sectional area of the holes is disposed essentially perpendicular to said longitudinal axis. The preferably cylindrically-shaped holes can thus have a circular cross-sectional shape, or have an anisotropic cross-section, in which preferably the long axis of the cross-sectional area of the hole is different from the short axis of the cross-sectional area of the hole, and wherein preferably the long axis of the cross-sectional area of the hole is larger than the short axis of the cross-sectional area of the hole.

Preferably, the distance between two adjacent holes (between two first ends of two adjacent holes) is constant throughout the entire length of a row, however, the distance can also vary within a row or between different rows. If two rows of holes are arranged in one web, the holes of the two rows can either be located at the same height along the longitudinal axis of the turbine component or web, or in a staggered fashion. The rows of exit holes can extend over the entire length of the web, or only a part thereof.

The cross-over holes preferably have a diameter, with respect to circular holes, or a length and/or width, with respect to anisotropic holes, in the range of approximately 0.5 to 5 mm. Anisotropic holes can, for example be designed with a length to width ratio ranging from approximately 1.2 to approximately 2.5, preferably approximately 2.0. This is to ensure that the mechanical integrity of the webs is maintained while at the same time ensuring that the maximum internal heat transfer coefficients are achieved within the holes. For circular holes, the ratio of diameters is 1.0. The first web is preferably arranged at an angle of approximately 60-120 degrees, preferably approximately 75-100 degrees with respect to a central plane longitudinally, i.e., essentially radially, dividing the airfoil portion into a suction side half and a pressure side half, the angle being measured between the suction side portion of the first web and the central plane toward the leading edge side of the first web. The perpendicular distance from said plane to an external surface of the suction side wall is the same as the perpendicular distance from said plane to an external surface of the pressure side wall at every point along the plane and/or preferably the second web extends from the first web in an angle of approximately 60-120 degrees, preferably approximately 75-100 degrees.

Preferably, at least one web between two adjacent chambers is provided with two rows of each approximately 10-30 holes, preferably approximately 20 holes, which preferably are impingement holes.

The trailing edge region preferably has a trailing edge chamber being provided with at least one exit hole in the suction side wall and/or the pressure side wall of the airfoil portion, said exit hole preferably being a film cooling hole. The size of that at least one exit hole, which preferably is at least one longitudinally extending row of exit holes, is preferably tailored according to the cross-sectional areas of the cross-over holes in the webs. The cross-sectional area of an exit hole in the trailing edge region, preferably of every individual exit hole in the trailing edge region, can be tailored to be between approximately 20% and approximately 55% of the cross-sectional area of an individual cross-over hole, preferably of each individual cross-over hole in the cross-over hole-containing web located closest to the trailing edge. More preferably, the cumulative area of all exit holes in the trailing edge region is tailored to be between approximately 20% and approximately 55% of the cumulative cross-sectional area of all cross-over holes in the cross-over hole-containing web located closest to the trailing edge.

Preferably, at least three chambers in the airfoil portion are provided with film-cooling holes, or rows of film cooling holes, respectively, in at least one of their bordering external walls, to allow exit of cooling medium from the cooling circuit at the pressure side and the suction side. Preferably, the cross-sectional areas of these film cooling holes within a longitudinally extending row remain constant in a direction from the root to the tip. The rows of exit holes can extend over the entire length of the web, or only a part thereof.

Preferably, the passageway of the cooling circuit extends from the root to the tip in a so-called serpentine fashion, wherein in at least one of the passages, or chambers, respectively, the air flows in a direction opposite to its direction at entry into the airfoil portion. This can be achieved if at least one of the chambers has a channel disposed, e.g., essentially perpendicular to the longitudinal axis, i.e., essentially perpendicular to the radial direction, of the turbine component in a region of the root and/or tip, such that the cooling air can pass through said channel and have an opposite flow direction with respect to its direction in the chamber it came from. Preferably, the channel is formed such that the air flow is directed to change its direction by approximately 180 degrees, i.e., such that the flow of air changes its direction from radially outwards to radially inwards or vice versa. According to a preferred embodiment of the invention, the second intermediate chamber and the trailing edge chamber are connected by such a channel in the root region, whereby the air flowing from tip to root in the intermediate chamber, i.e., radially inwards, changes direction such that in the trailing edge chamber the air flows from root to tip, i.e., radially outwards.

The length of the first web measured from the pressure side wall to the suction side wall is approximately in the range of between about 50% and about 90%, preferably between about 60% and about 80% of the maximum distance from the suction side to the pressure side within the airfoil portion when measured perpendicular to a central plane in a cross-sectional view.

It is of further advantage, if the portion of the suction side wall and/or of the pressure side wall bordering at least one side of the leading edge chamber, additionally comprises at least one exit hole, preferably at least one, preferably two, longitudinally extending rows of exit holes, for the discharge of cooling medium into the hot air path, said exit holes preferably being film cooling holes. Preferably, also at least the second entry chamber and/or at least one additional chamber is provided with at least one row of exit holes in one of its bordering portions of the suction side wall and/or of the pressure side wall.

The process used to manufacture the airfoil portion includes, but is not limited to, both advanced soluble core manufacturing technology and conventional ceramic core technology. For instance, the airfoil can be manufactured using soluble cores made of at least one T-shaped web section and at least one V-shaped web section and a combination of webs and/or at least one other web with a suction side wall and/or a pressure side wall.

Advantageously, at least one of the chambers is provided with at least one wall having at least one turbulence promoter, also named a turbulator, preferably in the form of ribs or other structures useful for the disturbance, deviation, or obstruction of a flow path. Preferably several or even all chambers have at least one turbulence promoter along one or more of their walls, i.e., the suction side wall and/or the pressure side wall. The turbulence promotors are preferably arranged such that the cooling air entering the chamber through an impingement hole impinges between ribs. Preferably, the turbulence promoters are disposed perpendicular to the longitudinal axis of the turbine component, extending into the chamber, i.e., the ribs of the turbulence promoter preferably extending from the wall into the chamber perpendicular to the longitudinal axis, in other words, essentially perpendicular to the radial direction of the turbine component. The turbulence promotors or turbulators, respectively, can also be angled with respect to the flow direction, preferably in the first entry chamber and/or the second entry chamber and/or the trailing edge chamber. Thereby, the air is directed toward the according cross-over and/or exit holes. Preferably, the turbulators or their ribs, respectively, have a trapezoidal shape, however, other geometrical shapes, whether symmetrical or asymmetrical, are possible. Preferably, the turbulators are arranged such that turbulator elements, such as ribs, have certain ratios between their widths and/or the width and height, and/or between the distance between adjacent turbulator ribs and their width and/or height.

BRIEF DESCRIPTION OF THE DRAWINGS

In the accompanying drawings preferred embodiments of the invention are shown in which:

FIG. 5, including

FIG. 6, including FIG. 7, including

FIG. 8, including FIGS. 8a-8d, is, in FIGS. 8a-8c a schematic top view of a wall with turbulators, according to three further embodiments of the invention, wherein in FIG. 8a the turbulators are arranged perpendicular to the flow direction, in FIGS. 8b and 8c at an angle to the flow direction, and FIG. 8d shows a cut through line C-C of FIG. 8a.

DETAILED DESCRIPTION OF EXEMPLARY EMBODIMENTS

Figure 1:
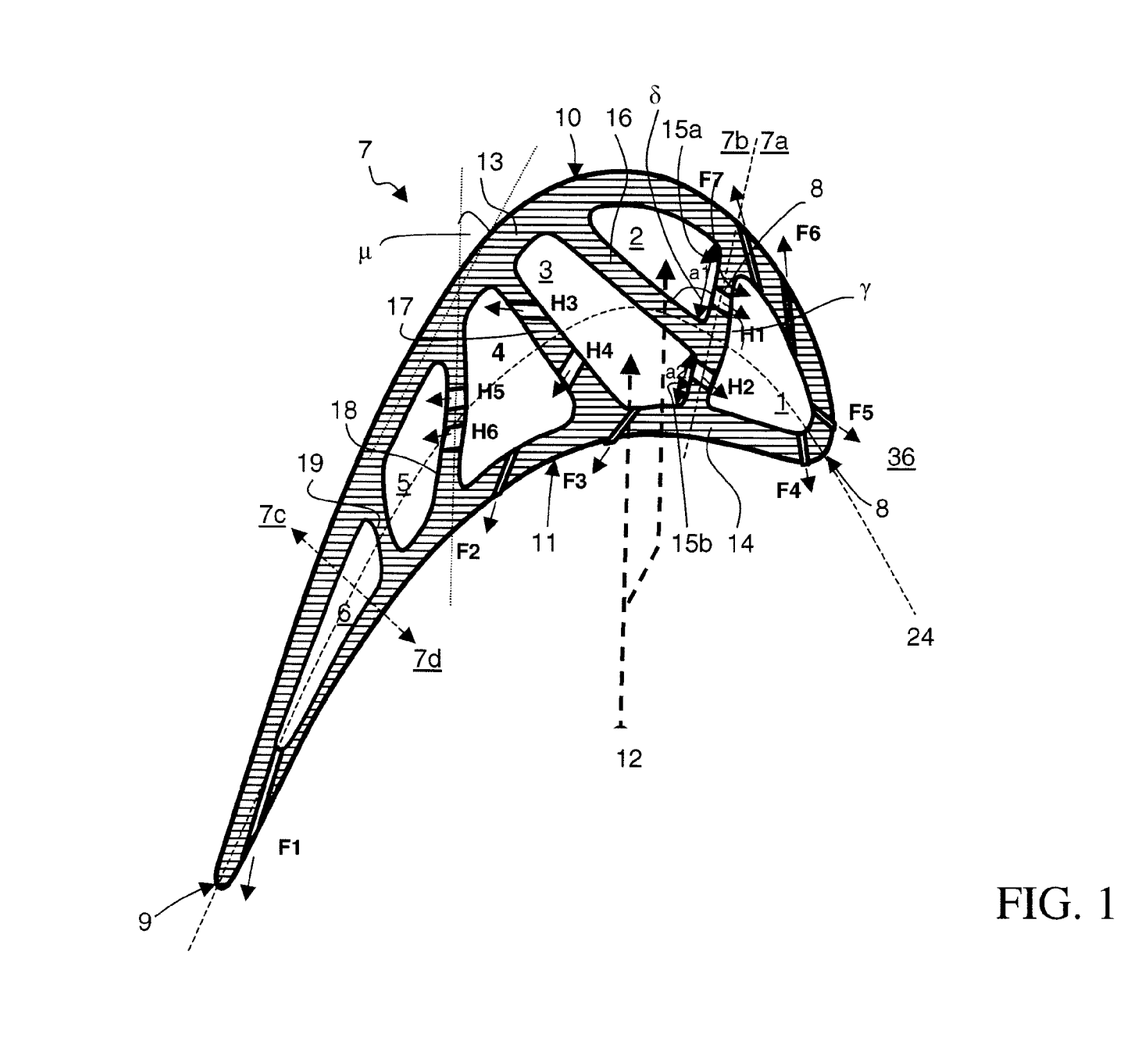
FIG. 1 is a cross-sectional view of a turbine component according to a first embodiment of the invention, perpendicular to its longitudinal axis.

Referring to the drawings, which are for the purpose of illustrating the present preferred embodiments of the invention and not for the purpose of limitation, FIG. 1 shows a cross-sectional view of an airfoil portion 7 of a turbine component 25, e.g., a blade or vane. Plane 24, which extends parallel to the longitudinal axis, i.e., in the radial direction, of the turbine component 25 has been marked in the figure, essentially dividing the airfoil portion 7 into a suction side half 7c and a pressure side half 7d. The distance from the plane 24 to the suction side wall 13 is equal to the distance from the plane 24 to the pressure side wall 14 in every point of the plane 24 when measured in the cross-sectional view of FIG. 1.

The airfoil portion 7, having a suction side 10 and a pressure side 11, is structured by a curved suction side external wall 13 and a curved pressure side external wall 14, which join each other at a leading edge 8 and a trailing edge 9 of the turbine component 25. The suction side wall 13 is convexly shaped and the pressure side wall 14 is concavely shaped toward the hot gas path 36. The external walls 13, 14 delimit and thereby enclose a central cavity. This central cavity is divided into a leading edge region 7a and a trailing edge region 7b by a first longitudinally extending wall or web 15, which connects the suction side wall with the pressure side wall, thereby defining a leading edge chamber 1. The leading edge chamber 1, which makes up the leading edge region 8 according to the embodiment of FIG. 1, is bordered on a first side by the first web 15, on a second side by a portion of the suction side wall 13 adjacent to the leading edge 8, and on a third side by a pressure side wall 14 portion adjacent to the leading edge 8. The first web 15 and/or any other web 16-19 preferably is straight, however, it can for instance also be curved or kinked. One can say that in the cross-sectional view, the second web 16 and the first web 15 together form a "T", of which the second web 16 comprises the leg, being based at the suction side wall 13, and the first web 15 forming the girder of the "T". By the connection with the second web 16 in a central region of the first web 15, the first web 15 is partitioned into two arms or arm portions 15a, 15b, which can be defined as a suction side arm portion 15a and a pressure side arm portion 15b, depending on the wall 13, 14 it is attached to. Preferably, the two arm portions 15a, 15b are essentially of the same length a1, a2, or are sized in a ratio of lengths a1:a2 in the range of about 0.25 to about 4.0, preferably about 0.5-2.0. As can be seen in FIG. 1, the second web 16 doesn't contact the pressure side wall 13, but on one side only a portion of the suction side wall 13 and on the other side the first web 15. With respect to the plane 24 drawn in FIG. 1, the depicted first web 15 is arranged at an angle γ in the range of approximately 60 to approximately 120 degrees, preferably approximately 100 to approximately 120 degrees, measured between its suction side portion 15a and the plane 24 toward the leading edge 8. The length of the first web 15 measured from the pressure side wall 14 to the suction side wall 13 is approximately in the range of between about 50% and about 90%, preferably between about 60% and about 80% of the maximum distance from the suction side 10 to the pressure side 11 within the airfoil portion 7 when measured perpendicular to a central plane in a cross-sectional view.

Within the trailing edge region 7b, the cavity is further divided by a longitudinally extending second web 16, connecting an essentially central region of the first web 15 with the suction side wall 14, thereby enclosing a first entry chamber 2. The first entry chamber 2 therefore is bordered on one side by the second web 16, on a second side by the suction side arm portion 15a of the first web 15, and on a third side by a portion of the suction side wall 13. The second web 16 is arranged at an angle δ of about 60-100 degrees, preferably about 70-90 degrees from the first web 15, the angle δ measured between the first web 15, i.e., the suction side portion 15a of the first web 15, and the second web 16 on the side of the second web 16 facing the suction side wall 13.

According to FIG. 1, further webs 17-19 connecting the suction side wall 13 with the pressure side wall 14 are provided to further divide the trailing edge region 7b of the cavity: A third web 17 separates the second entry chamber 3 from a first intermediate chamber 4, which is bordered by the third web 17, a portion of the pressure side wall 14, a fourth web 18 and a portion of the suction side wall 13. The fourth web 18 preferably is disposed at an acute angle μ with respect to the suction side wall 13. By providing a fifth web 19, a second intermediate chamber 5 is enclosed by the fourth web 18, a portion of the pressure side wall 14, the fifth web 19 and a portion of the suction side wall 13. Between the fifth web 19 and the trailing edge 9, a trailing edge chamber 6 is provided. It is enclosed by the portion of the pressure side wall 14 adjacent to the trailing edge 9, a portion of the suction side wall 13 adjacent to the trailing edge 9, as well as by the fifth web 19.

In the cross-sectional view of FIG. 1, the third web 17 shown is disposed approximately perpendicular to the plane 24, and essentially about parallel to the second web 16, while the fourth web 18 and the fifth web 19 are slightly inclined with respect to the plane 24, wherein the third web 17 is disposed almost parallel to the second web 16 and the fourth web 18 has an inclination with respect to the plane 24 opposite to the inclination of the second web 16 with respect to the plane 24, such that the second web 16 and the fourth web 18 are tilted toward each other in the cross-sectional view of FIG. 1. Further proportions and angles can be seen in FIG. 3.

According to FIG. 1, the third web 17 and fourth web 18 each contain two cross-over holes H3, H4 and H5, H6, respectively, which allow cooling air to flow from one chamber to the adjacent chamber. In the cross-sectional view, the cross-over holes in the third web 17 are angled, in other words, the axis of the holes is not perpendicular to the longitudinal plane of the web 17, 18 they are located in, such that the air flowing through the cross-over holes H3, H4 is directed into different directions within the first intermediate chamber 4. However, the cross-over holes in the fourth web 18 or the rows of holes, respectively, are arranged essentially parallel to each other, when seen in the cross-sectional view of FIG. 1, such that the air passing through the cross-over holes H1,H2 and/or H5,H6, respectively, flows through the web 15, 18 and into the according chamber 1, 5 in two parallel streams.

As can be seen in FIG. 1, the chambers 1-6 can be of various cross-sectional shapes, depending on the number and shapes of webs 15-19 and/or walls 13, 14 they are enclosed by. Here, the leading edge chamber 1, the first entry chamber 2, and the trailing edge chamber 6 are of an essentially triangular shape in the cross-sectional view, as each of them is bordered by three webs 15-19 and/or walls 13, 14. The two intermediate chambers 4, 5 are of an essentially trapezoidal shape, and the second entry chamber 3, which is bordered by five different webs and/or walls, essentially has five corners in the cross-sectional view.

The thickness of the webs 15-19 and/or walls 13, 14 can vary depending on the size and type of the turbine component. In the turbine component of FIG. 1, for instance, the second web 16 has a greater thickness than the first web 15. This is especially preferable concerning the function of the second web 16 in supporting the first web 15 and/or the entire geometry of the airfoil portion 7. Further, according to FIG. 1, the additional webs 16-19, have a successively smaller thickness toward the trailing edge 9 of the airfoil region 7. The thickness also can depend on the cross-sectional area of the cross-over holes in the webs 15-19.

While most chambers 1-6 in the airfoil portion 7 are arranged in series such that cooling medium flow may be generally directed within the airfoil portion 7 from a region of the leading edge 8 to a region of the trailing edge 9 thereof, advantageously, due to the first and second web 15, 16 with their cross-over holes H1, H2, part of the air is also directed from the entry chambers 2, 3 toward the leading edge 8.

Figure 2:
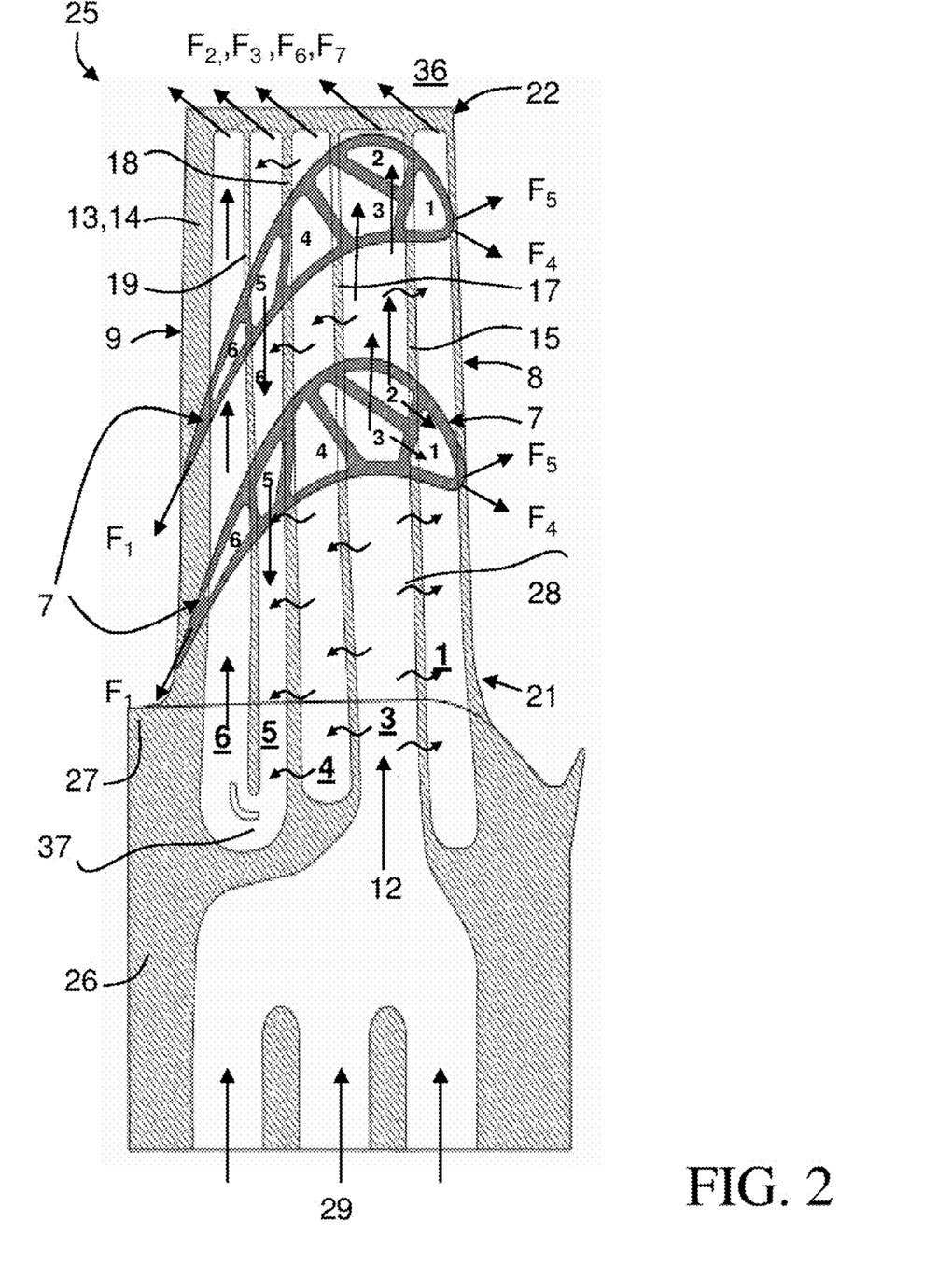
FIG. 2 is a longitudinal cross-sectional view of a turbine component according to one embodiment of the present invention with a schematic overlay of the cross-sectional views at different heights of the airfoil portion of FIG. 1 for clarification purposes.

In the cooling circuit 28 according to the invention, cooling air flows within the airfoil portion 7 of the turbine component 25 with a general flow direction from the root 21 to the tip 22. However, in a "serpentine cooling" type system, as, e.g., shown in FIG. 2, in at least one of the passages, e.g., passage 5 in FIG. 2, the air flows from the tip 22 to the root 21. For this purpose, the airfoil portion 7 according to FIG. 1 has six chambers 1-6 generally longitudinally extending between the root 21 and the tip 22, of which some are open toward the root 21 (as shown in FIG. 2). According to the embodiment of FIG. 1, the cooling air 29, e.g., coming from the compressor enters the blade or vane 25 through the first entry chamber 2 and the second entry chamber 3, the inlet flow into the airfoil portion 7 being depicted by the inlet arrows 12. After entry into the blade or vane 25, the cooling air is distributed, i.e., directed toward the leading edge 8 and the trailing edge 9. According to the depicted embodiment, cooling air from the first entry chamber 2 is directed into the leading edge region 7a, i.e., the leading edge chamber 1, through at least one cross-over hole H1, preferably a longitudinally extending row of cross-over holes in the first web 15. Cooling air which enters the second entry chamber 16 is directed both toward the leading edge 8 and toward the trailing edge 9. The cooling air directed from the second entry chamber 3 toward the leading edge 8 enters the leading edge chamber 1 through at least one cross-over hole H2, preferably a longitudinally extending row of cross-over holes in the first web 15. The cooling air directed from the second entry chamber 3 toward the trailing edge 9 enters a first intermediate chamber 4 through at least two cross-over holes H3, H4, preferably two rows of cross-over holes in the third web 17. Furthermore, cooling air can enter a second intermediate chamber 5 from the first intermediate chamber 4 through at least two cross-over holes in the fourth web 18 limiting the trailing edge side of the first intermediate chamber 4. The cross-over holes H1-H6 in the embodiment of FIGS. 1-7 are actually longitudinally, i.e., radially extending rows of impingement holes.

Due to the angled structure of the cross-over holes H3, H4 in the third web 17, cooling air, which passes through the first row of cross-over holes H3 of the third web 17, is directed toward the portion of the suction side wall 13 bordering the first intermediate chamber 4, while the air passing through the second row of cross-over holes H4 of the third web 17 is directed toward the portion of the pressure side wall 14 bordering the first intermediate chamber 4 on the opposite side. The air passing through the first row of cross-over holes H5 and the second row of cross-over holes H6 of the fourth web 18 is directed toward the portion of the suction side wall 13 bordering the second intermediate chamber 5 as two essentially parallel air streams.

Furthermore, the airfoil portion 7 depicted in FIG. 1 is provided with exhaust outlets F1-F7 through the external walls. Preferably, these exhaust outlets F1-F7 or exit holes preferably are so-called film cooling holes in the airfoil surface. Both the suction side wall 13 and the pressure side wall 14 can contain such exit holes. According to the airfoil portion 7 shown in FIG. 1, the leading edge chamber 1 has four such outlets F4-F7 for cooling air exhaustion, namely film cooling holes, of which three outlets F5-F7 are provided as passages through the suction side wall 13, and one outlet F4 as a passage through the pressure side wall 14. The second entry chamber 3 and the first intermediate chamber 4 each have one exit hole F3, F2, respectively, through the pressure side wall 13. An additional exit hole F1 is provided adjacent to the trailing edge 9 as a passage through the pressure side wall 13. The flow of the cooling air passing through the trailing edge film cooling holes F1 can have a direction approximately parallel to the plane 24 at the trailing edge 9 or can also be angled radially upwards towards the tip portion 22.

Figure 6:
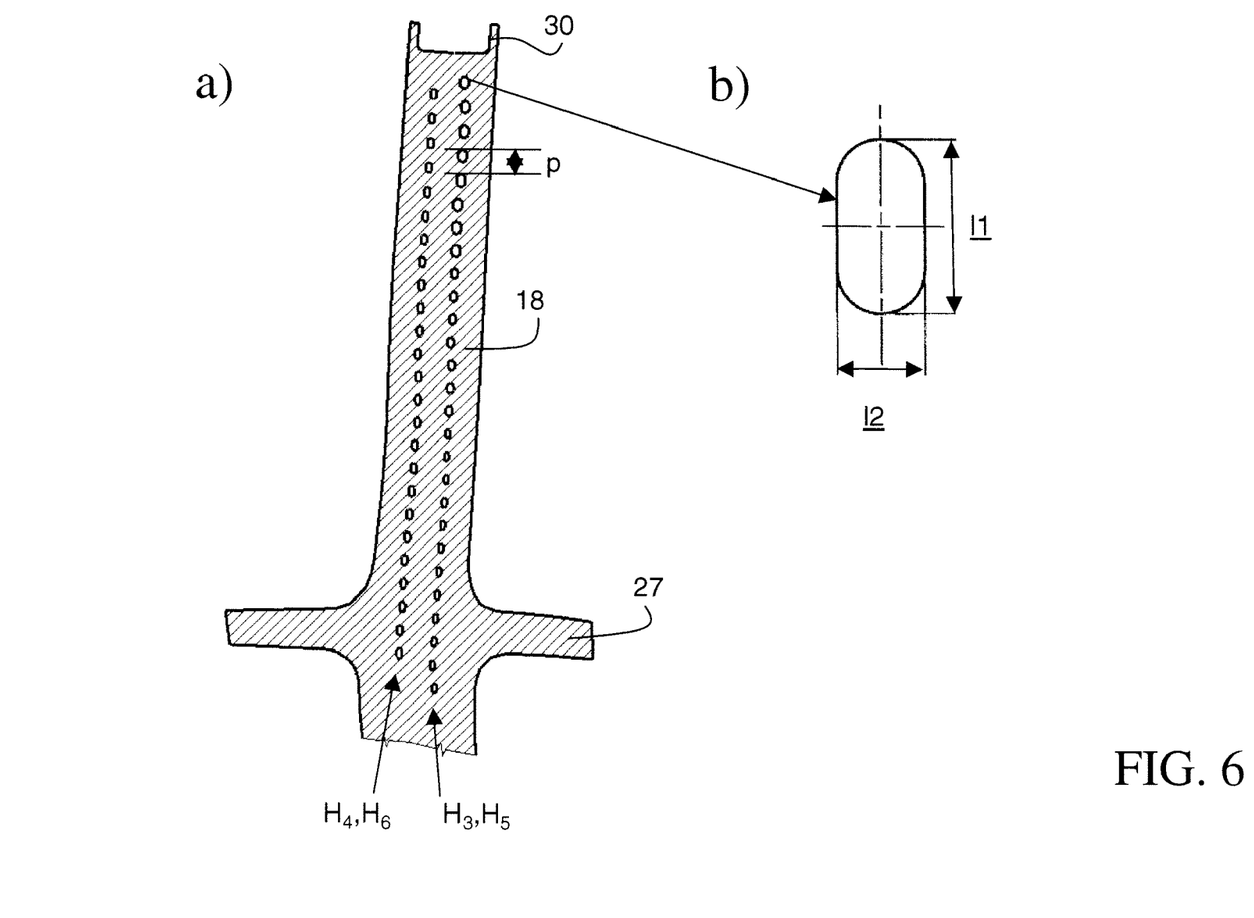
FIGS. 6a and 6b, is a cut along the line B-B of FIG. 4 in FIG. 6a), while FIG. 6b) shows an enlarged cross-section of one of the holes of FIG. 6a)

FIG. 2 shows a turbine component 25, here a blade, including a shank 26 and the airfoil portion 7 embodying principles of the invention. The shank 26 includes a blade platform 27, which aids in radially containing the turbine air flow and preferably a dove tail 30 or blade tip (see FIG. 6). The shank 26 attaches to a turbine rotor disc (not shown). An internal serpentine coolant circuit 28 has series-connected generally longitudinally extending passages 5, 6, which are formed as chambers in the cross-sectional view of FIG. 1, and are referred to as chambers below.

The coolant air generally flows from the root 21 to the tip 22 of the turbine component 25, the airfoil portion 7 being fed by cooling air which has been discharged from a compressor end exit (not shown). Coolant coming from the compressor enters the airfoil portion 7 through adjacent longitudinal passages or chambers 2, 3, i.e., the first entry chamber 2 and the second entry chamber 3. The air from the first entry chamber 2 and the second entry chamber 3 is directed into the leading edge chamber 1. From the leading edge chamber 1, exhaust air can exit into the hot gas path 36 through exit holes F4-F7, preferably film cooling holes, through the external walls 13, 14, i.e., the suction side wall 13 and/or the pressure side wall 14 of the airfoil portion 7. Additionally or alternatively to the film cooling holes, dust holes can also be provided at the tip 21. Generally, cooling air is subject to a pressure loss when flowing from root 21 to tip 22 and between chambers. Accordingly, the cross-over holes H1-H6 between webs 15-19 can be sized accordingly, such that the pressure loss does not have any consequences on the volume of air directed between the chambers of the airfoil portion 7 at the tip portion 22.

Air from the second entry chamber 3, however, as mentioned above, is not only directed toward the leading edge 8, but also toward the trailing edge 9 of the airfoil portion 7. The air flow passes through the third web 17 and after passing the first intermediate chamber 4, a portion thereof passes through the fourth web 18, into the second intermediate chamber 5. In the second intermediate chamber 5, which is open toward the root 21, the air flows in a longitudinal direction, in other words radially inwards toward the root 21 (downwards according to the view of FIG. 2) and enters the trailing edge chamber 6 by a 180 degree bend, by which the air change its flow direction and can flow back up toward the tip 22 of the airfoil portion 7 and be exhausted there through the trailing edge exit hole F1, possibly also through other film cooling holes F2-F7 in the external walls 13, 14 of the airfoil surface, preferably not only at the tip 22, but already along the way from the root 21 to the tip 22. Additionally, part of the air can also be discharged from the blade platform 27 via root sections of the rows of cross-over holes H3-H6 (not shown).

The coolant air can exit the airfoil surface through exit holes F1-F7, which preferably are film cooling holes. Arrows in FIG. 2 indicate the direction of air flow. The small curved arrows across the webs 15, 17, 18 indicate cooling air flow through cross-over holes H1-H6 in the webs 15, 17, 18, while straight arrows exiting the external walls 13, 14 indicate exit holes, i.e., film cooling holes, into the hot gas path 36.

Figure 3:
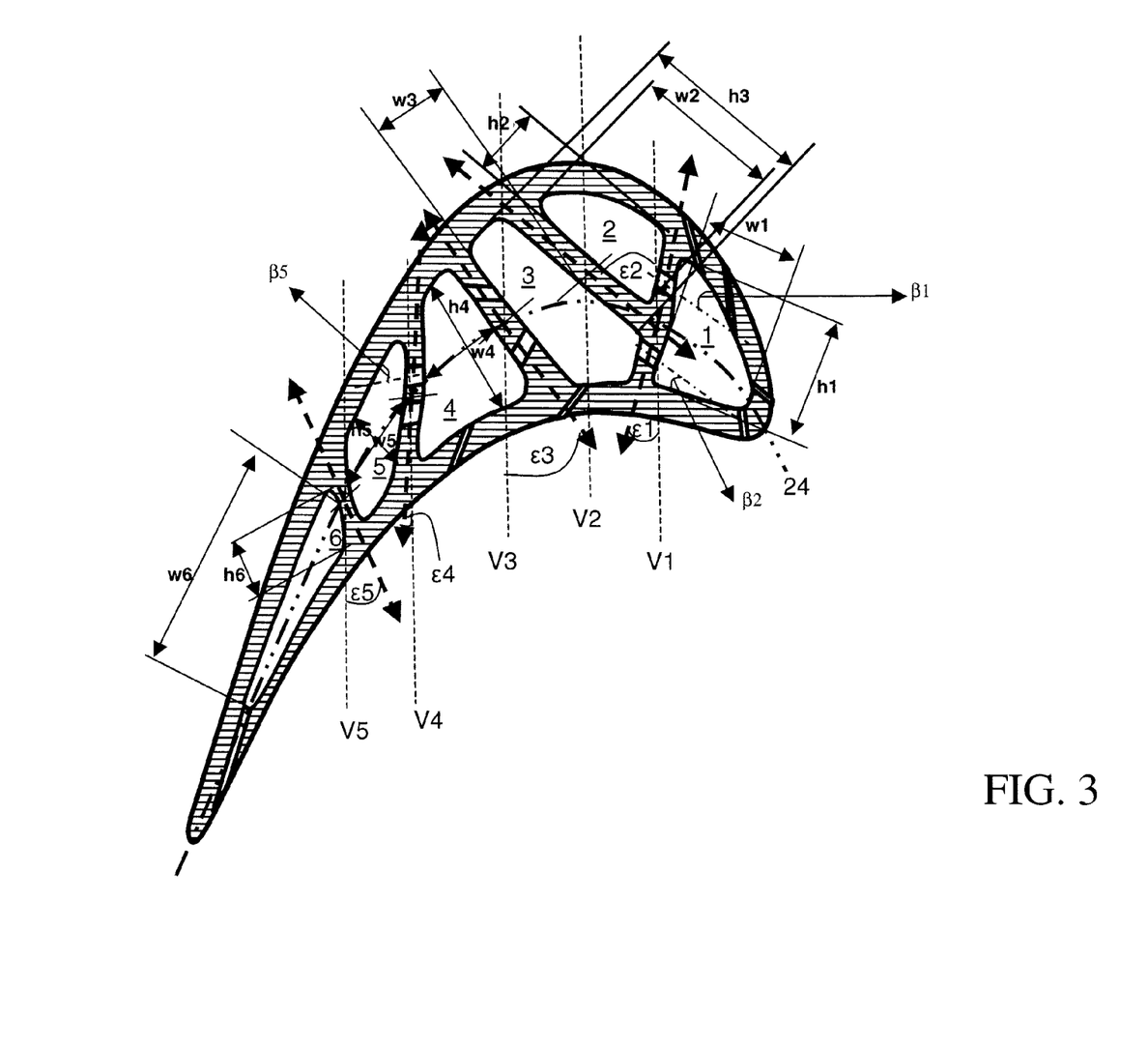
FIG. 3 is a cross-sectional view of the turbine component, perpendicular to its longitudinal axis, wherein angles of cross-over holes and webs are indicated.
Figure 4:
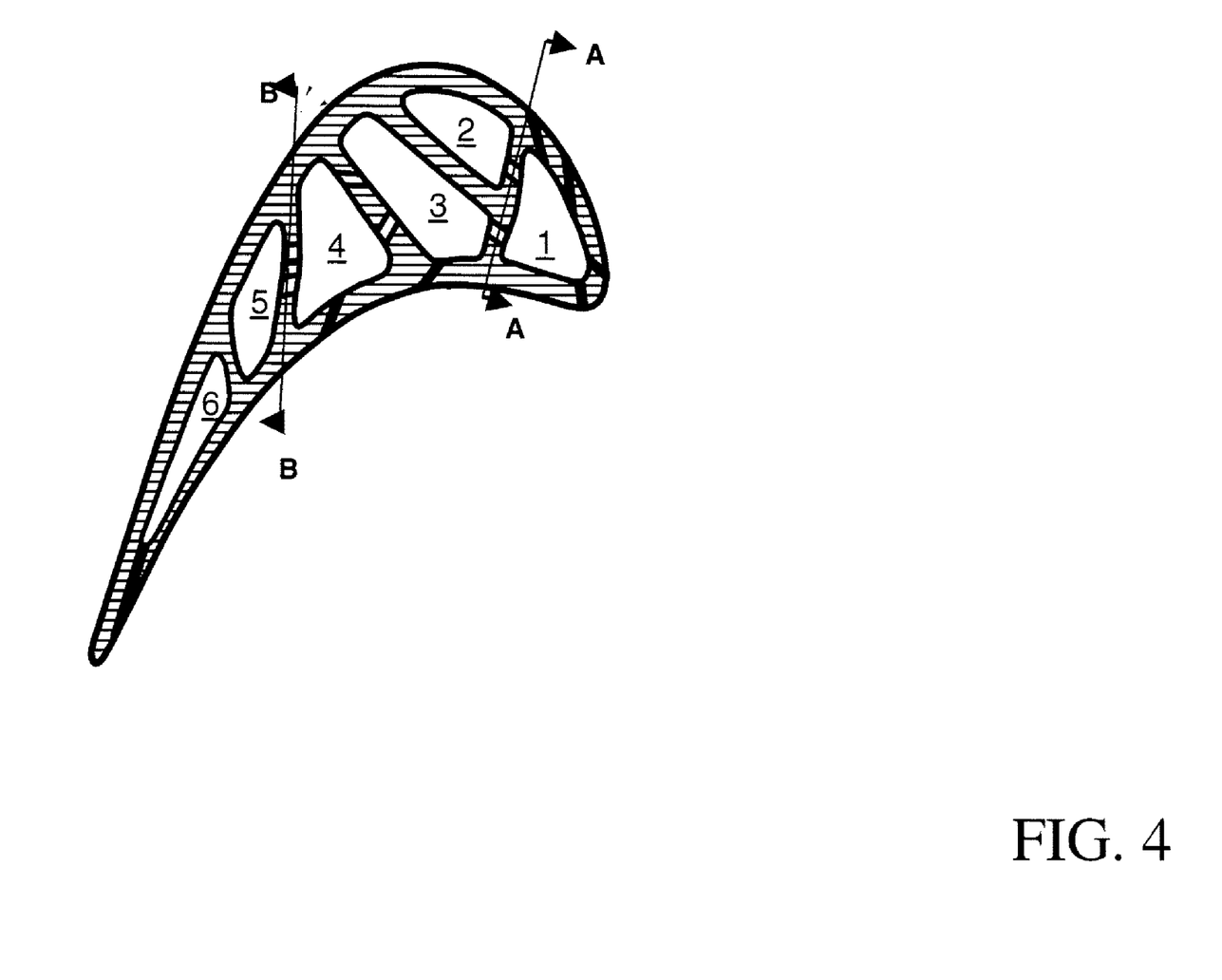
FIG. 4 is a cross-sectional view of the turbine component perpendicular to its longitudinal axis, wherein the lines for the cuts A-A of FIGS. 5 and B-B of FIG. 6 are indicated.

The passages, i.e., chambers 1-6 are specifically sized in terms of the passage cross-sectional area and the passage aspect ratio (h/w). Both these parameters define the pressure drop across the cross-over holes H1-H6, and the cooling mass flow entering the chambers 1-6. The height h and width w of some of the chambers 1-6 are defined by FIG. 3. The passage aspect ratio (h/w) for each passage has approximately the following ranges: chamber 1: h1/w1=0.8-1.2; chamber 2: h2/w2=0.3-0.5; chamber 3: h3/w3=1.7-2.2; chamber 4: h4/w4=1.1-1.6; chamber 5: h5/w5=0.5-1.0; chamber 6: h6/w6=0.1-0.3. Chambers 1-6 are specifically sized in terms of the passage area and aspect ratio such that the cooling air can be discharged from the film cooling holes F1-F7 with a pre-determined pressure, cooling mass flow, and velocity into the external hot gas path. The width w1-w6 is defined as indicated in FIG. 3 and is typically measured along the central longitudinal plane 24 for chambers 1 and 4-6. The height h1-h6 is defined as indicated in FIG. 3 and is typically measured half-way along the central longitudinal plane 24 and perpendicular to the plane within the corresponding chamber for chambers 3, 4, 5 with more than three walls. For chambers 1, 2, 6 with a triangular shape, the height h1, h2, h6 is typically the maximum projected length of one wall over the central longitudinal plane 24.

In addition, the thickness of the webs 15, 17, 18 containing the cross-over holes H1-H6 are sized or tailored according to the thickness of the adjacent wall. The ratio of the web thickness to the wall thickness varies in the range from approximately 0.8 to approximately 1.3 along the web height in the longitudinal, i.e., radial direction and preferably is reduced gradually or successively from the blade root 21 to the tip 22.

As mentioned before, according to the embodiment shown in the figures, the cross-over holes H1-H6 are in fact rows of cross-over holes, in which the holes are arranged one over each other in a longitudinal direction of the turbine component 25 or the web 15, 17, 18, respectively. Preferably, the distance p between two adjacent holes (between two first ends of two adjacent holes) is essentially constant throughout the entire length of a row. If two rows of holes H1-H6 are arranged in one web 15, 17, 18, the holes of the two rows can either be located at the same height along the longitudinal axis L of the turbine component 25 or web 15, 17, 18, or in a staggered fashion. Generally, the holes are of an essentially cylindrical shape, while their cross-sectional form can be, e.g., round or anisotropic. Anisotropic holes are defined as to have a first main axis of the cross-sectional area l1 and a second main axis of the cross-sectional area l2. Preferably, the holes are disposed in the web such that the first main axis l1 of the holes is essentially parallel to the longitudinal axis L of the turbine component 25 or web 15, 17, 18, and the second main axis l2 of the holes is disposed essentially perpendicular to the longitudinal axis L. Preferably, the first main axis l1 of an anisotropic hole is not equal to its second main axis l2, more preferably the first main axis l1 is larger than the second main axis l2.

Anisotropic cross-over holes, are specifically sized with a first main axis to second main axis ratio of the hole ranging from approximately 1.2 to approximately 2.5, the ratio preferably being approximately 1.8 to 2.2. The impingement holes forming the passages H1-H6 are aligned at an angle β between approximately 25 degrees to approximately 45 degrees to the surface of the impinged wall 23 (as defined by angle β in FIG. 3). This angle β, of which (β1, β2 and β5 are indicated in FIG. 3, varies along the radial length of each of the blade webs 15, 17, 18, such that the impingement effect on the internal wall surfaces of the suction side wall 13 and/or the pressure side wall 14 is maximized. The specific angles β1, β2 and β5 are indicated as examples in FIG. 3, wherein β1 is the angle between the first cross-over hole H1, i.e., between the flow direction of air through cross-over hole H1 and the suction side wall 13, which is impinged by air flowing through the cross-over hole H1, while β2 is defined as the angle between the second cross-over hole H2, i.e., between the flow direction of air through the second cross-over hole H2 and the pressure side wall 14, which is impinged by air flowing through the cross-over hole H2, and β5 is defined as the angle between the fifth cross-over hole H5, i.e., between the flow direction of air through the fifth cross-over hole H5 and the suction side wall 13, which is impinged upon by air flowing through the cross-over hole H5.

Figure 5:
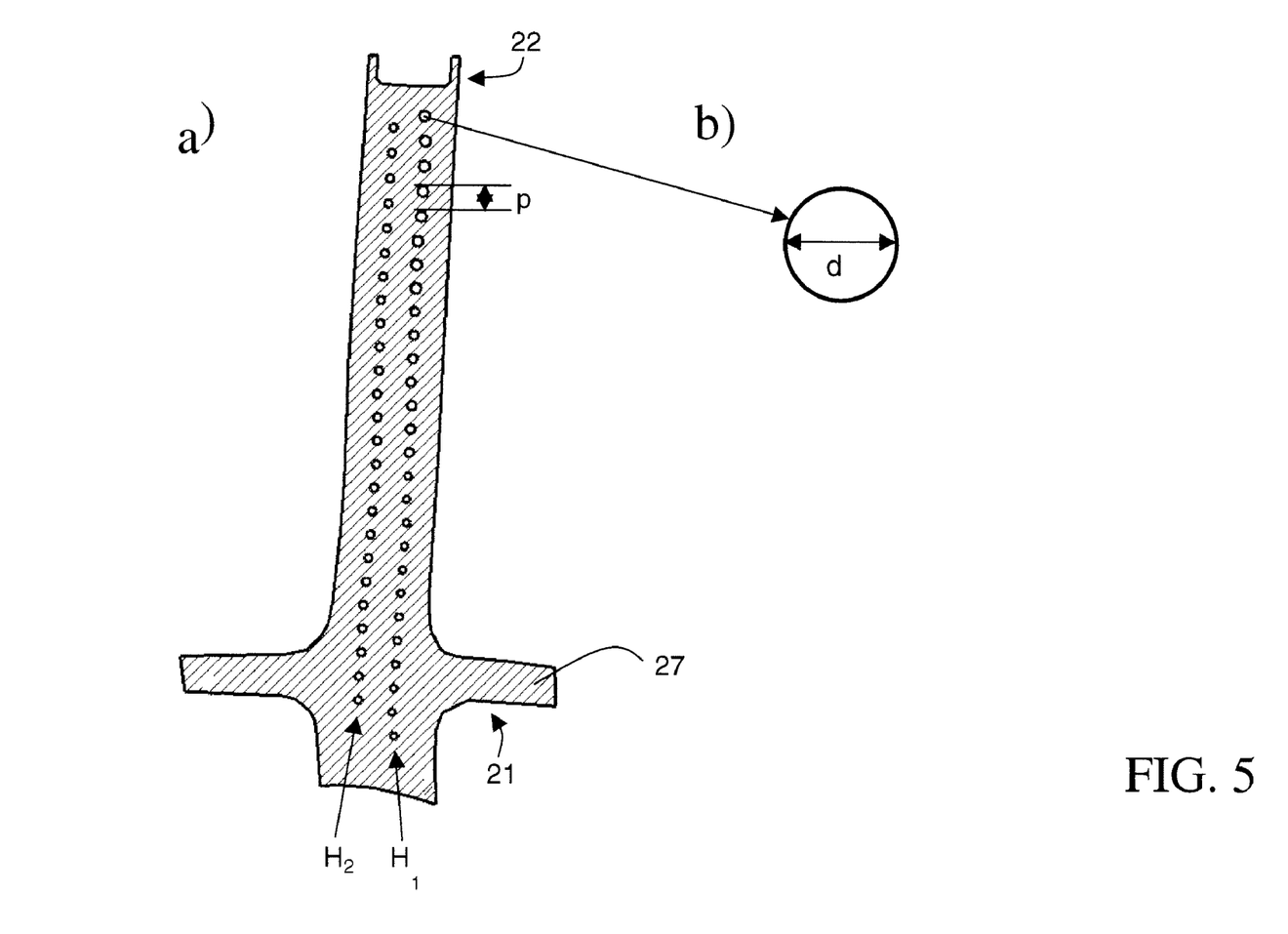
FIGS. 5a and 5b, is a cut along the line A-A of FIG. 4 in FIG. 5a), while FIG. 5b) shows an enlarged cross-section of one of the holes of FIG. 5a)

Preferably, and as shown in FIG. 5, the cross-over holes H1-H6 are pitched radially along the web (distance p in FIG. 5) at a distance in the range of approximately 2.5 to approximately 3.5 times the hole diameter d and preferably at a distance of approximately 3 times the hole diameter d, with respect to circular holes, or approximately 2.0 to approximately 4.0 times the length of the hole along the longer axis 11 with respect to anisotropically shaped holes.

As shown in FIG. 5, in the leading edge chamber 1, the rows of the cross-over holes H1 and H2 are staggered relative to each other. According to FIG. 6, in the first intermediate chamber 4, the cross-over holes H3, H4 are also staggered relative to each other in the respective rows. Also, preferably, the holes of the first row of cross-over holes H5 of the fourth web 18 are staggered relative to the holes of the first row of cross-over holes H3 of the third web 17, and the holes of the second row of cross-over holes H6 of the fourth web 18 are staggered relative to the holes of the second row of cross-over holes H4 of the third web 17.

The alignment of the webs 15, 17, 18 which contain the cross-over holes H1-H6 relative to the adjacent concave or convex wall is specifically defined such that the impingement cooling effect from the passages H1-H6 on the internal surfaces of the external walls 13, 14 of the airfoil portion 7 is maximized and additionally the passage areas and aspect ratios are maintained. In FIG. 3, the first web 15 has a pull angle $\epsilon 1$ in the range of approximately 15 to approximately 30 degrees. The pull angle $\epsilon 1$-$\epsilon 5$ of a web 15-19 is defined as the angle between a web 15-19 and a vertical direction V1-V5 with respect to the schematic view of FIG. 3, the vertical directions V1-V5 being indicated in FIG. 3 for the purpose of clarifying the relative locations of the pull angles $\epsilon 1$-$\epsilon 5$ in this figure. In the second web 16, the pull angle $\epsilon 2$ is in the range of approximately 55 to approximately 80 degrees. In the third web 17, the pull angle $\epsilon 3$ is in the range of approximately 10 to approximately 60 degrees. In the fourth web 18, the pull angle $\epsilon 4$ is in the range of approximately 10 to approximately 60 degrees. In the fifth web 19, the pull angle $\epsilon 5$ is in the range of approximately 10 to approximately 30 degrees.

Figure 7:
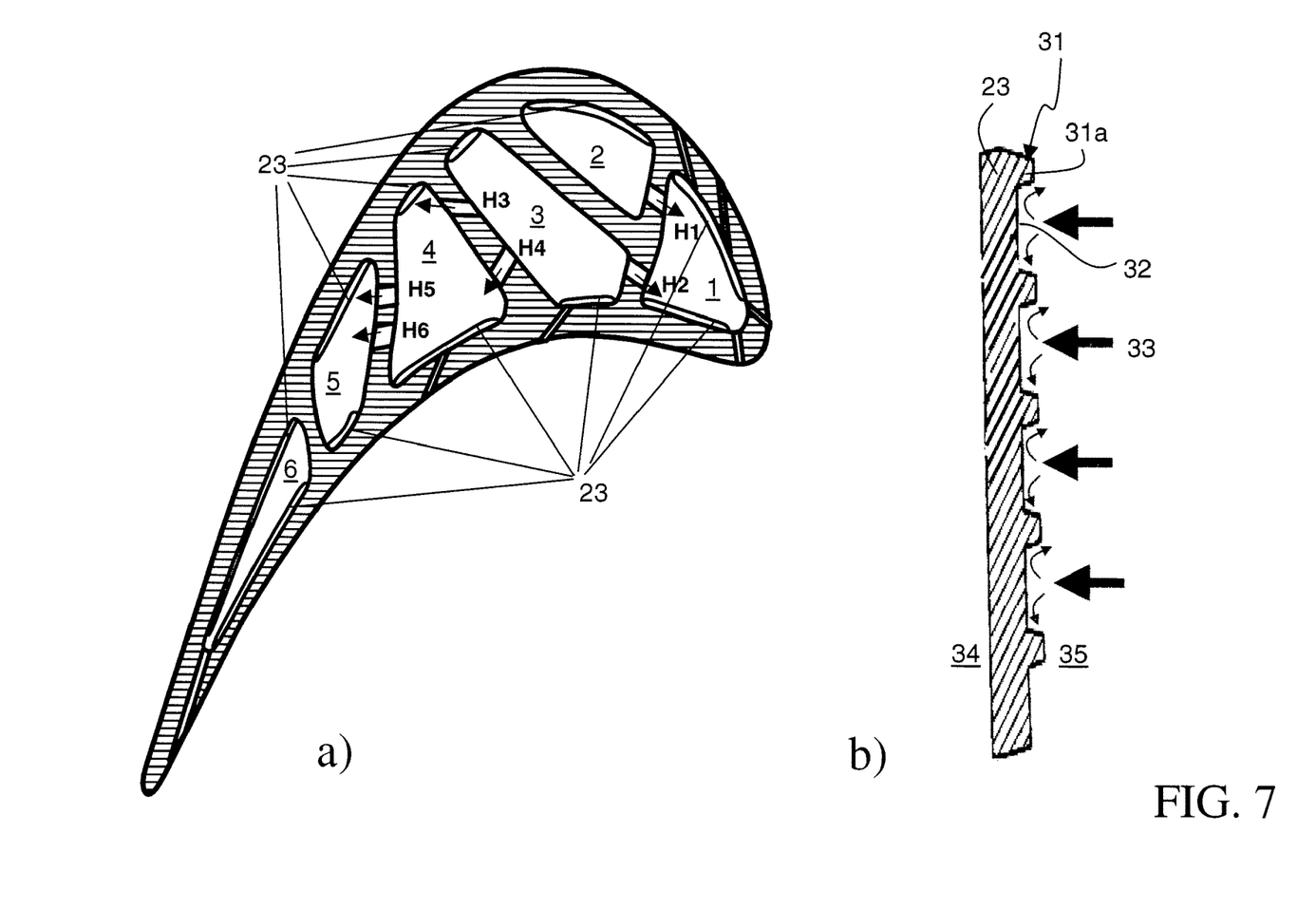
FIGS. 7a and 7b, is, in FIG. 7a a cross-sectional view of a turbine component according to a second embodiment of the invention, perpendicular to its longitudinal axis, and in FIG. 7b a cross-sectional view of the turbulators of FIG. 7a is shown.

As can be seen from FIG. 7a, in the embodiment shown, all chambers 1-6 contain at least one wall 23 with turbulators 31. The leading edge chamber 1, as well as the first and second intermediate chambers 4, 5 contain turbulators 31 according to the embodiment shown in FIG. 7b. The turbulators 31 are located on the inside of a chamber 1-6 at the external suction side wall 13 or pressure side wall 14. The arrows 33 indicate the airflow coming from the corresponding cross-over impingement holes H1-H6. Preferably, the holes H1-H6 are arranged such that the air coming from the holes H1-H6 meets the wall 23 between two ribs 31a. It therefore is advantageous if the turbulators 31 or the ribs 31a thereof, respectively, are arranged in a staggered fashion with respect to the holes H1-H6 along the longitudinal axis L. The air from the cross-over holes H1-H6 is said to "impinge" on such turbulators 31, or on the wall 23, respectively, between such ribs 31a such that the heat transfer coefficient from the impinged wall surface 23 is significantly enhanced. The air arriving on a groove surface 32 of a turbulator 31 on the chamber side 35 is deviated laterally onto the side walls of the ribs 31a and is thereby re-directed or swirled back into the chamber 1-6. The turbulators 31 of the first and second entry chambers 2, 3 and the trailing edge chamber 6, are inclined at an angle to the flow direction, the flow being in radial direction within the chambers 2, 3, 6, as shown in FIG. 2. The ribs 31a can be of various geometrical cross-sectional shapes, e.g., round, triangular, trapezoidal, etc.

Figure 8:
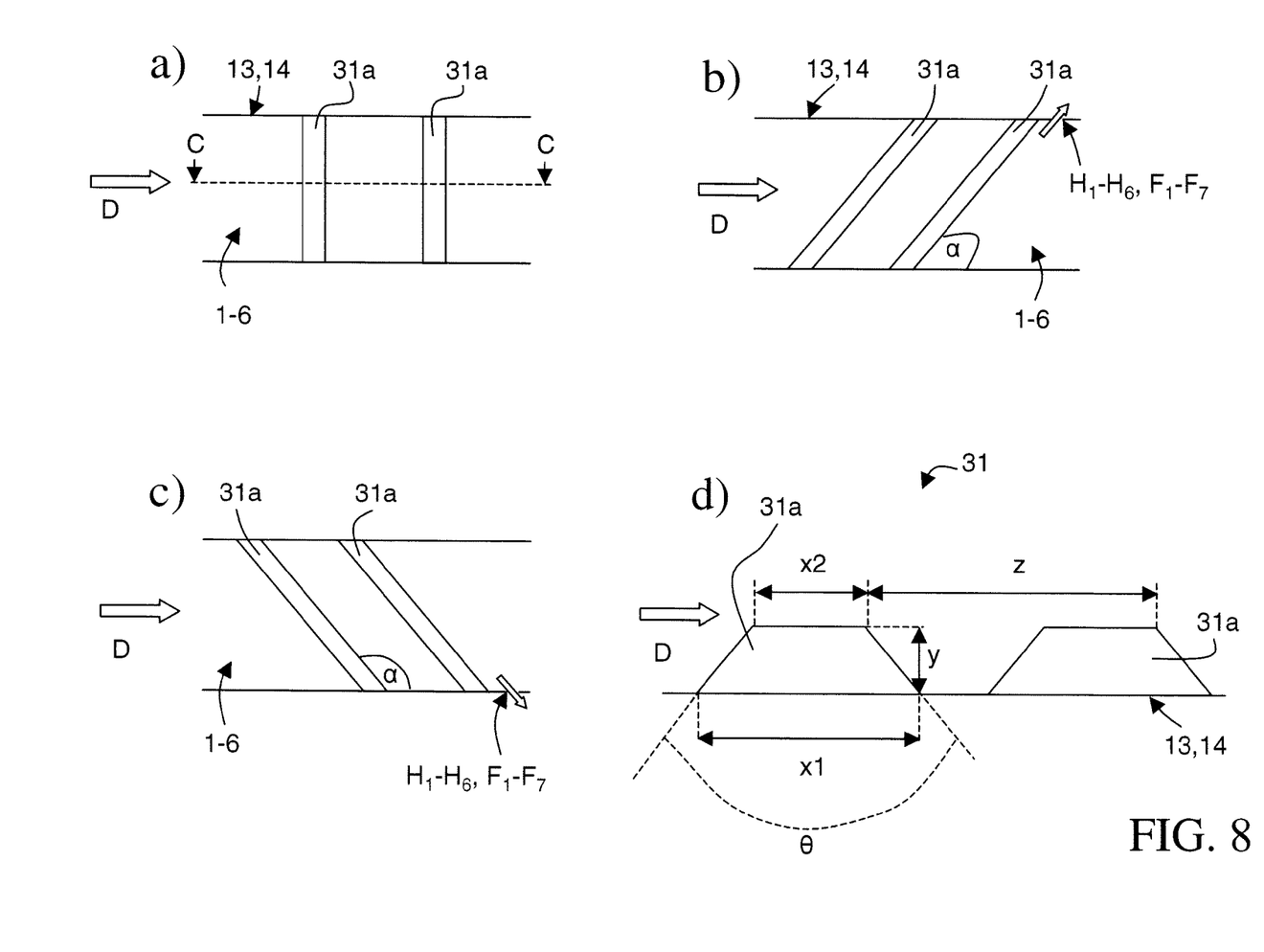

FIGS. 8a-8c show arrangements of turbulators 31 according to three embodiments of the invention, wherein only two neighboring turbulator elements, i.e., ribs 31a, are shown. According to FIG. 8a, the turbulators 31 are arranged essentially perpendicular to the flow direction D of the air. In the embodiment of FIG. 8b, the turbulators 31, or their ribs 31a, respectively, are arranged at an angle $\alpha$, which can range from approximately 5 to approximately 90 degrees, and can, e.g., be approximately 40 degrees with respect the flow direction, while in the embodiment of FIG. 8c, the turbulators 31 are arranged at an angle $\alpha$, which can range from approximately 0 to approximately 135 degrees, and can, e.g., be approximately 140 degrees with respect to the flow direction. Generally, the location angle $\alpha$ is in the range of approximately 45 degrees to approximately 135 degrees. The turbulators 31, or their ribs 31a, respectively, are arranged such that they direct at least a portion of the airflow into at least one cross-over hole, or a row of cross-over holes H1-H6 or into a film cooling exit holes F1-F7 or rows thereof. The lower width x1, of a turbulator rib 31a, such as, e.g., the base of a trapezoidal rib 31a, is indicated with reference numeral x1 in FIG. 8d. According to the embodiment shown in FIG. 8d, showing a cut through line C-C of FIG. 8a, the width of the trapezoidal rib 31a at its upper end is indicated with reference numeral x2, while its height is indicated as y. The distance from a first upper end of a first rib to a first upper end of a second rib, i.e., between two corresponding or equivalent ends of two adjacent ribs 31a, is indicated as z. The angle $\theta$ defined by the slanted sides, i.e., the trapezoidal shell of the trapezoidal rib 31a, preferably varies between approximately 10 degrees and approximately 35 degrees. The ratio of the lower width x1 to the upper width x2 preferably is in the range of approximately 1.25 to approximately 1.55, while the ratio of the upper width x2 to the height y of a rib 31a preferably is in the range of approximately 0.7 to approximately 1.3, and the ratio of the distance z between two ribs 31a to the height y of a rib 31a is in the range of approximately 5 to approximately 12.

LIST OF REFERENCE NUMERALS 1 leading edge chamber
2 first entry chamber
3 second entry chamber
4 first intermediate chamber
5 second intermediate chamber
6 trailing edge chamber
7 airfoil portion
7a leading edge region
7b trailing edge region
7c suction side half
7d pressure side half
8 leading edge
9 trailing edge
10 suction side
11 pressure side
12 air inlet
13 suction side wall
14 pressure side wall
15 first web
15a suction side arm portion of 15
15b pressure side arm portion of 15
16 second web
17 third web
18 fourth web
19 fifth web
20 longitudinal axis of turbine component
21 root portion 22 tip portion
23 impinged wall
24 central longitudinal plane
25 turbine component
26 shank
27 platform
28 coolant circuit
29 cooling air from combustor
30 dovetail
31 turbulance promoter, turbulator
31a rib
32 groove
33 cooling air from impingment holes
34 wall facing side of 23
35 chamber facing side of 23
36 hot gas path
37 channel
D flow direction of air
H1-H6 cross-over holes, rows of impingement holes
F1-F7 film cooling exit holes
a1 length of 15a
a2 length of 15b
d diameter of circular impingement hole
h chamber height of chamber
w chamber width
h/w aspect ratio
l1 first main axis of hole
l2 second main axis of hole
x1 lower-/base width of 31a
x2 upper width of 31a
y height of 31a
z distance between two corresponding ends of 31a
α location angle of 31a
β angle of cross-over hole
β1, 5 angle of H1, H5 to suction side wall
β2 angle of H2 to pressure side wall
γ angle between 15 and 24
δ angle between 15 and 16
ε1-ε5 pull angle of 15-19
μ angle between 14 and 17
θ shell angle of 31a While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A gas turbine engine component comprising:
   a root and a tip separated along a longitudinal axis;
   an airfoil portion having a leading edge, a trailing edge, an external suction side wall, and an external pressure side wall, the external walls extending between said leading edge and said trailing edge, said external walls enclosing a central cavity for the passage of cooling air between the root and the tip;
   at least one longitudinally extending first web connecting said suction side wall with said pressure side wall, said at least one first web partitioning said cavity into a leading edge region and a trailing edge region and defining a leading edge chamber in the leading edge region;
   a second longitudinally extending web connecting said at least one first web with the suction side wall and defining a first entry chamber on the suction side of the second web and a second entry chamber for cooling air in the trailing edge region;
   wherein said at least one first web comprises at least one cross-over hole between the first entry chamber and the leading edge chamber, and wherein the second web is devoid of openings;
   wherein the at least one cross-over hole in the at least one first web between the first entry chamber and the leading edge chamber comprises a longitudinally extending row of holes, and wherein the cross-sectional area of the holes of said row is larger in a region of the tip than in a region of the root.

2. The component of claim 1, wherein the at least one first web is partitioned into two longitudinal wall portions by said second web.

3. The component of claim 2, wherein the second web partitions the at least one first web at a region along the at least one first web between 30% and 70% of the distance between the suction side wall and the pressure side wall.

4. The component of claim 2, wherein the second web partitions the at least one first web at a region along the at least one first web between 40% and 60% of the distance between the suction side wall and the pressure side wall.

5. The component of claim 2, wherein the second web partitions the at least one first web at a region along the at least one first web approximately half the distance between the suction side wall and the pressure side wall.

6. The component of claim 1, wherein the cross-sectional area of the holes of said longitudinally extending row of holes successively increases from the root to the tip.

7. The component of claim 1, wherein said at least one first web further comprises at least one cross-over hole between the second entry chamber and the leading edge chamber.

8. The component of claim 7, wherein said at least one cross-over hole between the second entry chamber and the leading edge chamber comprises a longitudinally extending row of holes.

9. The component of claim 1, wherein the suction side wall, the pressure side wall, or both, comprises at least one exit hole configured and arranged for the exhaust of cooling air.

10. The component of claim 1, further comprising:
    a third web connecting the suction side wall with the pressure side wall on the trailing edge side of the second entry chamber, the third web separating the second entry chamber from the trailing edge.

11. The component of claim 10, further comprising:
    a first intermediate chamber between the third web and the trailing edge.

12. The component of claim 11, further comprising:
    at least one cross-over hole in the third web.

13. The component of claim 12, further comprising:
    a fourth web connecting the suction side wall with the pressure side wall, the fourth web positioned between the first intermediate chamber and the trailing edge, the fourth web comprising at least one cross-over hole.

14. The component of claim 13, wherein the at least one cross-over hole in the third web, in the fourth web, or in both, comprises at least two cross-over holes.

15. The component of claim 13, wherein the at least one cross-over hole in the fourth web comprises a longitudinally extending row of holes.

16. The component according to claim 13, wherein the at least one cross-over hole in the third web, in the fourth web, or in both, comprises at least two cross-over holes arranged in a longitudinal row, the cross-sectional area of the at least two cross-over holes being larger in a region of the tip than in a region of the root.

17. The component of claim 16, wherein the cross-sectional area of the at least two cross-over holes successively increases from the root to the tip.

18. The component of claim 1, wherein said trailing edge region comprises a trailing edge chamber and at least one exit hole in the suction side wall or the pressure side wall of the airfoil portion.

19. The component of claim 1, wherein at least one of the chambers comprises a channel disposed perpendicular to the longitudinal axis in a region of the root, of the tip, or of both, such that the cooling air can pass through said channel and have a flow direction opposite that of the chamber from which the flow came.

20. The component of claim 19, wherein the channel is configured and arranged such that the air flow is directed to change its flow direction by approximately 180 degrees.

21. The component of claim 15, wherein, in at least one row of said at least one row of longitudinally extending holes in the fourth web, the holes have a cross-section with a first main axis in the direction of the longitudinal axis of the component or of the fourth web different in length from a second main axis in a direction perpendicular to the first main axis.

22. The component of claim 21, wherein the length of the first main axis is larger than that of the second main axis.

23. The component of claim 1, wherein the second web is at least as thick as the first web.

24. The component of claim 1, wherein the length of the first web from the pressure side wall to the suction side wall is between about 50 and about 90 percent of the maximum distance from the suction side to the pressure side within the airfoil portion measured perpendicular to a central plane in a cross-sectional view.

25. The component of claim 1, wherein the length of the first web from the pressure side wall to the suction side wall is between about 60 and about 80 percent of the maximum distance from the suction side to the pressure side within the airfoil portion measured perpendicular to a central plane in a cross-sectional view.

26. The component of claim 1, wherein a portion of the suction side wall, of the pressure side wall, or of both, bordering at least one side of the leading edge chamber comprises at least one exit hole configured and arranged to discharge cooling medium into the hot air path.

27. The component of claim 26, wherein the at least one exit hole comprises at least one longitudinally extending row of exit holes.

28. The component of claim 27, wherein the at least one longitudinally extending row of exit holes comprises at least two longitudinally extending rows of exit holes.

29. The component of claim 26, wherein at least the second entry chamber comprises at least one exit hole in a bordering portion of the suction side wall, of the pressure side wall, or of both.

30. The component of claim 29, wherein the at least one exit hole in the second entry chamber comprises at least one row of exit holes.

31. The component of claim 1, wherein at least one of the chambers comprises at least one turbulence promoter.

32. The component of claim 31, wherein the at least one turbulence promoter comprises ribs configured and arranged to obstruct or deviate a flow path.

33. The component of claim 1, wherein the at least one first web is arranged at an angle of approximately 60-120 degrees with respect to a central plane longitudinally dividing the airfoil portion into a suction side half and a pressure side half.

34. The component of claim 1, wherein the at one first web is arranged at an angle of approximately 75-100 degrees with respect to a central plane longitudinally dividing the airfoil portion into a suction side half and a pressure side half.

35. The component of claim 1, wherein the second web extends from the at least one first web at an angle of approximately 60-120 degrees.

36. The component of claim 1, wherein the second web extends from the at least one first web at an angle of approximately 75-100 degrees.

* * * * *